(12) United States Patent
Wang

(10) Patent No.: US 8,476,359 B2
(45) Date of Patent: Jul. 2, 2013

(54) POLYOLEFIN BASED HOT MELT ADHESIVE HAVING IMPROVED HEAT RESISTANCE

(75) Inventor: Baoyu Wang, Waukesha, WI (US)

(73) Assignee: Bostik, Inc., Wauwatosa, WI (US)

( * ) Notice: Subject to any disclaimer, the term of this patent is extended or adjusted under 35 U.S.C. 154(b) by 339 days.

(21) Appl. No.: 11/505,588

(22) Filed: Aug. 17, 2006

(65) Prior Publication Data

US 2007/0187032 A1 Aug. 16, 2007

Related U.S. Application Data

(60) Provisional application No. 60/708,953, filed on Aug. 17, 2005.

(51) Int. Cl.
*C08K 5/00* (2006.01)

(52) U.S. Cl.
USPC .......................................................... 524/515

(58) Field of Classification Search
None
See application file for complete search history.

(56) References Cited

U.S. PATENT DOCUMENTS

| 3,965,215 A * | 6/1976 | Lopez et al. ............... 525/319 |
| 4,010,140 A * | 3/1977 | Bullard et al. ............. 526/237 |
| 4,022,728 A | 5/1977 | Trotter et al. |
| 4,120,916 A | 10/1978 | Meyer et al. |
| 4,761,450 A | 8/1988 | Lakshmanan |
| 5,317,070 A | 5/1994 | Brant et al. |
| 5,478,891 A | 12/1995 | Lakshmanan et al. |
| 5,723,546 A | 3/1998 | Sustic |
| 5,747,573 A | 5/1998 | Ryan |
| 6,143,818 A | 11/2000 | Wang et al. |
| 6,329,468 B1 | 12/2001 | Wang |
| 6,797,774 B2 * | 9/2004 | Kijima ............................ 525/55 |
| 2002/0007033 A1 | 1/2002 | Karandinos et al. |

FOREIGN PATENT DOCUMENTS

| WO | WO 01/10967 | 2/2001 |
| WO | WO 01/46277 | 6/2001 |
| WO | WO 01/53408 | 7/2001 |
| WO | WO 01/81493 | 11/2001 |
| WO | WO 03/033612 | 4/2003 |
| WO | WO 2004/039907 | 5/2004 |

* cited by examiner

*Primary Examiner* — Sheeba Ahmed

(74) *Attorney, Agent, or Firm* — Wozny Law, LLC; Thomas M. Wozny

(57) ABSTRACT

A polyolefin based hot melt adhesive composition having improved heat resistance includes a blend of about 5% to 50% by weight of a glassy semicrystalline poly-alpha-olefin polymer, about 5% to 70% by weight of a soft or rubbery polymer, about 5% to 65% by weight of a tackifier, about 0% to 3% by weight of a stabilizer and optionally a wax and/or plasticizer. The composition can also contain other additives and fillers to further modify its properties. An application process for the adhesive composition and various articles assembled therewith are also disclosed. The composition is particularly suited for applications where complicated bonding needs exist that involve bonding of multiple components or parts fabricated from dissimilar materials ranging from steel to plastic to fabrics.

20 Claims, 3 Drawing Sheets

POLYOLEFIN BASED HOT MELT ADHESIVE HAVING IMPROVED HEAT RESISTANCE

CROSS REFERENCE TO RELATED APPLICATION

This application claims priority to U.S. Provisional Application No. 60/708,953, filed Aug. 17, 2005.

FIELD OF INVENTION

A polyolefin based hot melt adhesive composition having improved heat resistance is disclosed that comprises a glassy semicrystalline alpha-olefin polymer, a soft or rubbery polymer, a tackifier, a stabilizer and optionally a wax and/or plasticizer. The composition can also contain other additives and fillers to further modify its properties. The invention also relates to an application process of the adhesive composition and various articles assembled therewith. The composition is particularly suited for applications where complicated bonding needs exist that involve bonding of multiple components or parts fabricated from dissimilar materials ranging from steel to plastic to fabrics.

BACKGROUND OF THE INVENTION

Hot melt adhesives typically exist as solid masses at ambient temperature and can be converted to a flowable liquid by the application of heat. These adhesives are widely used in manufacturing a variety of disposable and non-durable goods where bonding of various substrates is often necessary. Specific applications include disposable diapers, hospital pads, feminine sanitary napkins, pantyshields, surgical drapes and adult incontinent briefs, collectively known as disposable nonwoven products. Other diversified applications have involved paper products, packaging materials, tapes and labels. In most of these applications, the hot melt adhesive is heated to its molten state and then applied to a substrate. A second substrate is then immediately brought into contact with and compressed against the first. The adhesive solidifies on cooling to form a bond.

The major advantage of hot melt adhesives is the absence of a liquid carrier, as would be the case of water or solvent based adhesives, thereby eliminating the costly process associated with solvent removal. Such disposable or non-durable goods are usually used in mild conditions where extreme exposure to heat or cold are not normally encountered. Typical hot melt adhesives used in such applications are either based on an ethylene-vinyl acetate (EVA) copolymer or a styrenic block copolymer (SBC) such as styrene-isoprene-styrene (SIS) and styrene-butadiene-styrene (SBS) triblock copolymers. Hot melt adhesives consisting of amorphous poly-alpha-olefins are also used on a much smaller scale.

Hot melts also find some applications in manufacturing of OEM durable goods such as appliances and automobiles. In such applications, the structure integrity and durability at elevated as well as sub-ambient temperatures must be maintained. It is equally important that the adhesive must have long term durability to withstand environment cycles of varying temperature and humidity that are often encountered, for example, during use in an automobile. Traditionally, hot melt adhesives of choice in these applications consist primarily of polyesters, polyamides and moisture-curable polyurethanes for their high temperature resistant capability. These adhesives have provided acceptable performance in bonding engineering plastics such as polycarbonate and ABS resin to metal or to other materials over the years. These adhesives, however, are known to have a short pot life, a narrow application temperature window and high cost. In the case of moisture curable polyurethane, potential health hazards and premature curing in application equipment are also of great concern. Moreover, there is current trend to shift away from engineering plastics in favor of polyolefin type materials in the OEM durable goods industries as advanced high impact resistance polyolefins become available. Due to their poor adhesion to polyolefins, hot melts based on polyesters, polyamides and polyurethanes have become unsuitable for today's bonding needs. A need, therefore, exists for a hot melt adhesive that provides high temperature resistance, environmental durability, good adhesion to polyolefins, good application characteristics, long pot life and versatility to bind a wide range of dissimilar materials.

Various hot melt adhesive compositions containing amorphous poly-alpha-olefins (APAOs), APAO/polyethylene (PE) blends, APAO/polybutene (PB) blends, or APAO/isotactic polypropylene (IPP) blends are also known in the art. These adhesives typically consist of an APAO, or an APAO blend herein mentioned above, and a hydrocarbon type of tackifier. It is well know that adhesives based on APAOs generally have poor cohesive strength, poor heat resistance, low elevated temperature bond strength and low shear values. APAOs have not found much use for durable goods applications where a combination of high temperature resistance and high bond strength to a wide range of dissimilar substrates and easy application by conventional hot melt coating equipment is required. The APAO based adhesives usually lack such capabilities. Although various attempts were made to address these problems by blending APAO with PE, PB and the conventional IPP, very often such modifications not only failed to rectify the problems, but also led to adverse side effects of losing adhesion. These prior art APAO adhesives, consequently, usually do not have the performance properties to meet the demanding requirements of manufacturing durable goods.

For example, Trotter et al, in U.S. Pat. No. 4,022,728, describes a hot melt pressure sensitive composition comprising a mixture of APAOs, a low molecular weight substantially amorphous elastomer, a liquid tackifier and a conventional crystalline isotactic polypropylene (IPP) in the amount of up to 2% by weight. It is claimed that the composition provides good adhesive properties at low temperatures.

Meyer et al, in U.S. Pat. No. 4,120,916, discloses hot melt adhesive compositions comprising a blend of low molecular weight polyethylene, low molecular weight conventional propylene containing polymer and APAO. These adhesive compositions are said to offer short open time and to be useful for bonding of paraffin modified corrugated board.

Lakshmanan et al, in U.S. Pat. No. 4,761,450, discloses a polymer blend useful as a hot melt adhesive comprising a low density ethylene polymer, a copolymer of butene-1 with ethylene or propylene, a hydrocarbon tackifier and a low molecular weight polymer consisting of a low molecular weight liquid polybutene, an amorphous polypropylene and mixtures thereof.

Lakshmanan et al, in U.S. Pat. No. 5,478,891, also discloses blend compositions containing (a) a high molecular weight copolymer of ethylene with an α-olefin having at least 4 carbons and (b) an amorphous polypropylene or amorphous polyolefin. The components of the blends are described as having molecular weight ranges between 300 to 6000. The polymer blends are claimed to be useful for hot melt adhesives, coatings, sealants, asphalt modifiers and plastic additives.

Ryan discloses in U.S. Pat. No. 5,747,573 an APAO based hot melt adhesive composition useful for bonding plastics and metallized foil containers. The adhesive composition contains a blend of APAO, a solid benzoate plasticizer and a hydrocarbon tackifier.

Sustic, in U.S. Pat. No. 5,723,546, discloses a polymer blend consisting of a high molecular weight average, predominantly atactic flexible polyolefin polymer and a low molecular weight average APAO. The blend is said to be useful for hot melt adhesives.

Blending APAO with PE, PB or the conventional IPP generally leads to severe drawbacks. The prior art adhesives containing APAO/PE or APAO/PB blends, such as, for example, those described herein above in U.S. Pat. Nos. 4,120,916, 4,761,450, and 5,478,891, tend to have poor compatibility. These adhesives can undergo phase separation during their application process at which the hot melt adhesives have to be kept in the molten state at high temperature for a prolonged period of time, sometimes for hours or even days. Charring, skinning and gelling can develop rather quickly in the phase separated hot melt adhesives, thereby causing the application equipment to block or plug-up. The incompatibility of such polymer blends also imparts brittleness, optical haziness, poor or no open time, and low bond strength. Although APAO and the conventional IPP blend based hot melt do not have the compatibility problems, they still suffer from all the other drawbacks herein described above. Moreover, due to high crystallinity and high melting point of the conventional IPP polymers, hot melt adhesives based on APAO/IPP blends tend to be hard and brittle unless the IPP polymer amount is kept at a very low level, such as, for example, at about or below 2% by weight as disclosed in the prior art U.S. Pat. No. 4,022,728. As a result, these adhesives will have poor tensile strength, poor bond strength and poor impact resistance. Another detrimental effect of IPP is the increased coating temperature. The adhesive must be heated above the melting point of IPP (ranging from 180 to 200° C.) for it to reach liquid state. The blend of high and low molecular weight atactic polyolefin approach described in U.S. Pat. No. 5,723,546, although offering some improvement on tensile properties of APAO, has not been able to provide sufficient tensile strength and high temperature properties to overcome the deficiencies of sole APAO based hot melts.

A hot melt adhesive composition containing semicrystalline flexible polyolefins is disclosed by Wang in U.S. Pat. No. 6,329,468 B1 and in WO 01/53408 A1. Another hot melt adhesive composition comprising ethylene-propylene rubber and semicrystalline olefinic polymers is disclosed by Wang et al in U.S. Pat. No. 6,143,818. These compositions are well suited for disposable goods manufacturing. Due to its high amount of plasticizer requirement, however, the compositions are not capable of providing the necessary heat resistant for assembling durable goods.

In a prior U.S. Pat. No. 5,317,070, Brant et al disclosed a hot melt adhesive based on tackified syndiotactic polypropylene (SPP) having a polymer chain of at least 80% racemic dyads and having a melting point of about 100 to 180° C. The adhesive is claimed to have good open times between the application of the adhesive and the formation of the joint. This type of tackified SPP usually lacks flexibility and toughness, and therefore, will also have poor bond strength and poor impact resistance. Furthermore, SPP exhibits inherent shrinkage problems when it transforms from liquid to solid crystalline state. The shrinkage often causes stress concentration at the adhesive/substrate interface, and consequently, catastrophic bond failure.

Harandinos et al disclosed polypropylene based adhesive compositions in WO 01/46277 A2 wherein the polypropylene referred to is a class of semicrystalline copolymers of propylene with one or more other alpha olefins, and adhesive alpha-olefin interpolymers in Patent Application Publication Pub. No. US 2002/0007033 A1 wherein the polymers were largely amorphous types comprising alpha olefin monomers having C3 to C10 carbon atoms. In a related publication, WO 01/81493 A1, Faissat et al disclosed a method of processing the C3-C10 amorphous copolymer hot melts by various spray techniques. In the case of semicrystalline polypropylene based composition, the adhesive has the same shortcomings as those for the SPP compositions of U.S. Pat. No. 5,317,070. In the case of amorphous types of polyolefin, the adhesive exhibits poor heat resistance similar to all other APAO based adhesives.

SUMMARY OF THE INVENTION

It is, therefore, an objective of the present invention to provide a polyolefin based hot melt adhesive composition to meet the needs herein mentioned above.

It is another objective to teach the art of using the adhesive composition of the present invention in assembly applications for manufacturing durable goods.

It is another objective of the invention to provide a process, or a means to apply the present adhesive composition to the target substrate and subsequently bond to the second substrate.

It is another objective to provide articles bonded by the composition of the present invention.

The objectives of the present invention are met by a novel polyolefin based adhesive composition comprising a glassy alpha olefin polymer, a soft or rubbery polymer, a tackifier, a stabilizer and optionally a wax and/or plasticizer. The composition can also contain other additives and fillers to further modify its property.

The adhesive composition of the present invention will advantageously overcome the shortcomings of the prior art adhesives herein mentioned above. A particular aspect of the present invention is that a synergistic effect exists in blending a glassy alpha olefin polymer with a soft or rubbery polymer in a hot melt composition, wherein the former provides cohesive strength and heat resistance and the later flexibility and adhesion. Due to this synergy, the adhesive composition of present invention possesses a unique combination of properties including high temperature resistance, environmental durability, good adhesion to polyolefins, good application characteristics, long pot life and versatility to bond a wide range of dissimilar materials. The composition will have a viscosity between 2,000 and 100,000 cP, preferably between 5,000 and 50,000 cP and most preferably between 5,000 and 30,000 cP, a R&B softening point between 200 and 350° F., preferably between 220 and 320° F. and most preferably between 240 and 310° F., a shear adhesion failure temperature (SAFT) greater than 180° F., preferably greater than 200° F. and most preferable greater than 220° F. and an open time in the range of 10 seconds to 30 minutes, preferably between 10 seconds and 15 minutes and most preferably between 30 seconds and 10 minutes. The adhesive composition can be applied by means of any known hot melt applying techniques including, but not limited to, continuous or intermittent slot, combed slot, wheel, roll and bead coating, continuous or intermittent spiral spray, melt blown, control-coat, omega coating, summit coating and the like.

The hot adhesive composition of the present invention comprises as components thereof a mixture of the following ingredients:

1. About 5% to 50% by weight, preferably about 10% to 30% by weight of a glassy poly-α-olefin polymer having a melting point or a glass transition temperature greater than 60° C., preferably great than 100° C., more preferably greater than 120° C. and most preferably greater than 130° C.; a melt index (MI) or melt flow rate (MFR) from 0.1 g/10 min to 2,000 g/10 min, preferably from 5 g/10 min to 200 g/min and most preferably from 8 g/10 min to 100 g/10 min; the said polyolefin polymer being selected from the group consisting of any polymerization products of at least one α-olefin having C2 to C10 carbon length. Although any polyolefin herein mentioned above may be used for the present invention, the polymers consisting of primarily propylene (C3) monomer units are preferred;
2. About 5% to 70% by weight, preferably about 15% to 55% by weight of a soft or rubbery polymer having a glass transition temperature (Tg) below 20° C., preferably below 0° C. and most preferably below −10° C., a MI or MFR of 1.0 g/10 min to 5,000 g/10 min, or a Brookfield viscosity at 177° C. of 100 mPa·s to about 500,000 mPa·s, or a Mooney number of about 5 to about 200, the said amorphous polymer being selected from the groups that include, but not limited to, APAO, ethylene-propylene rubber (EPR) and ethylene-propylene-diene rubber (EPDM), polyethylene and polypropylene elastomers, polyethylene and polypropylene plastomers, polyisoprene and polybutadiene;
3. About 5% to 65% by weight of a compatible tackifier;
4. A stabilizer in the amount of about 0% to 3% by weight;
5. Optionally a plasticizer in the amount of about 0% to 10% by weight; and
6. Optionally a wax in the amount of about 0% to about 50% by weight. The adhesive composition may contain other components such as a filler/and or a colorant and/or adhesion promoter and/or optical brightener and/or other polymer that can modify the adhesive properties of the above basic adhesive composition, as desired; the components of the composition adding up to 100% by weight.

The present invention also relates to means of coating the hot melt composition by a hot melt coating or applying device that consists primarily of at least two of following components:

1. A melting container such as Nordson™ Hot melt melter;
2. A hot melt conveying and/or metering unit such a gear pump or roller;
3. A reservoir to hold the molten hot melt for access by the metering unit;
4. At least one connector that is capable to conduct molten material from one unit to another, such as a temperature controlled hose;
5. At least one coating head such as continuous or intermittent slot, combed slot, wheel, roll and bead coating, continuous or intermittent spiral spray, melt blown, control-coat, omega coating, summit coating and the like;
6. An optional regulator for intermittent application;
7. Temperature controller(s); the said controller(s) may resides with each unit or separately on a control panel;
8. A speed controller to control the rate of adhesive flow of the metering unit.

The control components, such as temperature controllers and speed controller, may reside within the component they control or may reside separately on a centralized control panel. The configuration of the device varies according to the actual operation needs and conditions. The device may serve as a stand-alone coating unit or may form a part of more complicated coating machine such as a web lamination line. Examples of such coating device are shown in FIGS. 1 and 2.

The present invention also relates to a process of coating or applying the adhesive composition by means of using the hot melt coating device herein disclosed above, which includes the following steps:

1. Melt the adhesive by means of a suitable melting container such as a Nordson™ Hot melt melter or the like at a temperature of about 250° F. to about 450° C., preferably of about 300° F. to about 400° F. and most preferably of about 350° F. to about 400° F.;
2. Apply or coat the hot melt composition to a first substrate;
3. Bond the said first substrate to a second substrate by bringing the said substrates into contact with each other under compression or pressure;
4. Transport the bonded part or web to subsequent processing steps in the production cycle.

In today's durable good manufacturing environment, one often encounters various and complicated adhesive bonding applications where a number of different components or parts are involved. These components or parts are usually made of different materials, and therefore, poses stringent requirements for adhesives to provide good adhesion to a broad spectrum of substrates and to have the durability and heat resistance for the integrity and harsh application environment. Prior art hot melts based on EVA, SBC block copolymer, APAO, polyester and polyamide either lack adhesion, especially on untreated plastic materials, or heat resistance or both and therefore, cannot meet all the requirements. The present invention is well suited to meet the needs that prior art hot melt failed to provide and offers excellent adhesion, bond durability and heat resistance for bonding metal, treated or untreated plastic, wood, woven and nonwoven fabrics, coated and noncoated paper boards, rubber hoses, vulcanized rubber profiles, polyolefin and polyurethane foams, electrical cables, wire harnesses, and glass to each other and to itself. The end products of the bonding process include, but are not limited to, finished goods, components or parts that are used subsequently to make finished goods, and intermediates that will be further processed or incorporated into or combined with other materials to produce parts or finished goods.

DETAILED DESCRIPTION OF THE INVENTION

Figure 1:
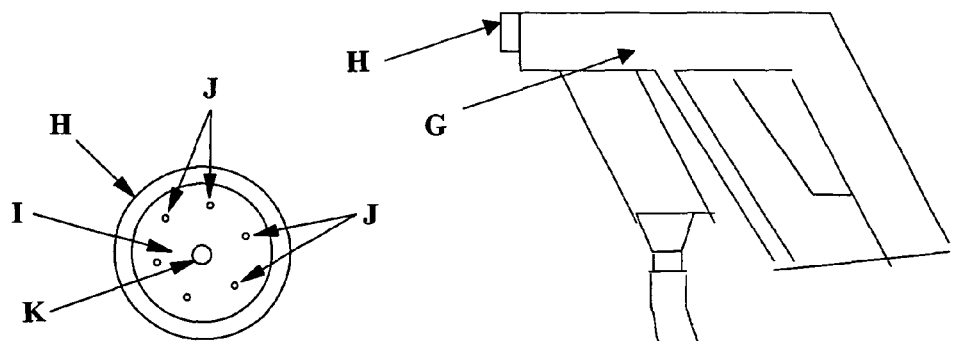
FIG. 1 is a schematic illustration of a commercial hand-operated coating device.

In accordance with the present invention, a hot melt adhesive composition is produced, comprising a mixture of a glassy poly-α-olefin polymer, a soft or rubbery polymer, tackifier, a stabilizer and optionally a wax and/or a plasticizer. The composition of the present invention also includes one or more other additives such as a filler, a colorant, an adhesion promoter, and an optical brightener and the like to further modify its properties, as desired.

The hot melt adhesive composition of the present invention comprises about 5% to 50% by weight, preferably about 10% to 30% by weight of a glassy poly-α-olefin polymer as one of the major polymer components. The glassy poly-α-olefin can be selected from the group consisting of any polymerization products of at least one α-olefin monomer having C2 to C10 carbon length. Copolymers between two or more said monomers are preferred. The polymers suitable for the present invention are usually semicrystalline and will advantageously have a melting point, as measured by DSC method, greater than 60° C., preferably great than 100° C., more preferably greater than 120° C. and most preferably great than 130° C.; a melt index (MI) for ethylene type of polymers, per ASTM D1238-190° C./2.16, or melt flow rate (MFR) for propylene type of polymers, per ASTM D1238-230° C./2.16, from 0.1 g/10 min to 2,000 g/10 min, preferably from 5 g/10 min to 200 g/min and most preferably from 8 g/10 min to 100 g/10 min. Although any poly-α-olefins herein mentioned above may be used for the present invention, the polymers consisting of primarily propylene (C3) monomer units are preferred; examples of such propylene polymers include the conventional isotactic propylene homopolymer, random and impact copolymers, syndiotactic polypropylene homo and copolymers (SPP). The more preferred glassy polymers for the composition of present invention are metallocene catalyzed homopolymers or copolymers of propylene with one or more other α-olefin monomers selected from the group consisting of ethylene and C4 to C10 α-olefin monomers. The most preferred glassy polymers are a class of bi-component polymer blends of propylene with EPR or EPDM rubber, the later polymer blends can be prepared either by mechanical blending or by in-situ polymerization method such as Catalloy™ process developed by Basell. The preparations of the types of poly-α-olefins herein described above are well known to those skilled in the art and are commercially available from a number of sources such as Total Petrochemicals under the trade name designation Finacene™ and Finaplast™, from ExxonMobil Chemical Company under the trade name designation Exact™, and from Basell under the trade name designation Adflex™.

One of the preferred types of polyolefin of the hot melt composition of the present invention is SPP polymers. The art of preparing SPP polymers have been disclosed in U.S. Pat. Nos. 3,305,538 and 3,258,455 to Natta et al, U.S. Pat. No. 4,892,851 to Ewen et al, U.S. Pat. No. 5,270,410 to Job, U.S. Pat. No. 5,340,917 to Eckman et al, U.S. patent and U.S. Pat. No. 5,476,914 to Ewen et al., the entire disclosures of which are hereby incorporated by reference. While syndiotactic propylene homopolymer can be used in the hot melt composition of the present invention, syndiotactic polypropylene copolymers are preferred. Suitable SPP copolymers can be prepared by copolymerization of propylene with other unsaturated olefin monomers containing 2 to 10 carbon atoms, which include, but are not limited to, ethylene, butene-1, pentene-1, 4-methyl pentene-1, hexene-1 and octene-1. These homopolymers and copolymers can be manufactured with any prior art process herein described above. However, the polymers prepared by using the method disclosed in U.S. Pat. No. 5,476,914 with metallocene catalyst system are preferred. Compared with other methods, the SPP polymers prepared with metallocene catalyst will have better stereoregularity, narrower molecular weight distribution and more uniform comonomer distribution, which lead to better physical and mechanical properties and superior processability. The most preferred type of SPP polymer is metallocene catalyzed copolymer of propylene with ethylene or butene-1 having ethylene or butene-1 comonomer content ranging from about 2% to 20% by weight.

The SPP polymers useful in the present invention preferably have syndiotactic content as measured by NMR r value equal to or greater than 70%, more preferably greater than 80% and most preferably greater than 85%. The said polymers generally have a density in a range from about 0.85 g/cc to about 0.90 g/cc and preferably from 0.86 g/cc to 0.88 g/cc at the room temperature as measured per ASTM D-1505 test method. Examples of polymers of this type are available under trade designation Finaplast™ Total Petrochemicals, Inc., Houston, Tex.

Another preferred polyolefin for the composition of the present invention is single-site catalyst (SCC) prepared random copolymer of ethylene and propylene (mRCP). The art of preparing mRCP has been disclosed in U.S. Pat. No. 5,476,914 to Ewen et al., the entire disclosure of which is hereby incorporated by reference. Suitable mRCP polymers can be prepared by polymerization of propylene with at least one of other unsaturated olefin monomers containing 2-10 carbon atoms, which include, but not limited to, ethylene, butene-1, petene-1,4-methyle petenen-1, hexane-1 and octane-1. The most preferred mRCP polymer is a copolymer of propylene with ethylene or butene-1. The mRCP polymers of the type herein described above are available under the trade name designation Finacene from Total Petrochemicals.

Another preferred polyolefin for the composition of the present invention is a group of products known as thermoplastic polyolefins (TPO) consisting of a blend of a glassy semicrystalline polyolefin component and a soft, rubbery and essentially amorphous polyolefin component such EPR and EPDM. The TPO can be produced by mechanical mixing of glassy and rubbery polyolefins through an extruder or Banbury Mixer or the like. It can also be prepared in situ by step-wise polymerization in a single or a series of parallel reactors. An example of such in situ reactor process is the Catalloy Process employed by Basell USA Inc., Wilmington, Del. This process utilizes multiple gas phase reactors in parallel that allow separate polymerization of different olefin monomer feed stock in each reactor. Each reactor runs independently of the other to produce the glassy semicrystalline polyolefin and the said soft and rubbery polyolefin components separately. The product of each reactor is then blended together to create a TPO directly from the polymerization process. Examples of TPO of this type are Adflex brand TPOs, which are blends of EPR and semicrystalline polyolefin comprising predominately propylene monomer units.

The composition of the present invention includes, as the second major polymer component, from about 5% to 70% by weight and preferably about 15% to 55% by weight of a soft or rubbery polymer having a glass transition temperature (Tg) below 20° C., preferably below 0° C. and most preferably below −10° C. It shall be understood that the soft or rubbery polymer herein mentioned refers to either a class of low molecular weight, essentially amorphous α-olefin polymers known as APAO, or a class of soft, high molecular weight, low tensile strength polymeric materials conventionally known as synthetic rubber, which includes, but not limited to, ethylene-propylene rubber (EPR), ethylene-propylene-diene rubber (EPDM), butyl rubber, polyisoprene, polybutadiene, and styrene-butadiene rubber (SBR).

The APAO polymers useful in the present invention consists of several different categories of atactic, low molecular weight, low melt viscosity, and essentially amorphous propylene based polymers. These polymers are well known to those skilled in the art and can be either homopolymers of propylene or copolymers of propylene with one or more α-olefin comonomer, such as, for example, ethylene, butene-1, hexene-1 and octene-1. The average weight molecular weight of the APAO polymers in the scope of the present invention is in the range of from about 1,000 to about 300,000 g/mol, preferably from about 10,000 to about 100,000 g/mol. The said polymers have advantageously a softening point between about 80 and 170° C. and a glass transition temperature from about −5 to −40° C. Although any APAO polymer falling in the range of physical properties herein described above can be used, the most preferred APAO is selected from the group consisting of propylene homopolymer, propylene-ethylene copolymer, propylene-butene-1 copolymer and propylene-ethylene-butene-1 terpolymer. The APAO polymers of the types herein described above are commercially available from Eastman Chemical Company, Kingsport, Tenn., under the trade name designation Eastoflex or from Huntsman Corporation, Houston, Tex., under the trade name designation Rexflex or from Degussa Corporation, Passipanny, N.J., under the trade name designation Vestoplast.

The synthetic rubber useful in the present invention includes ethylene-propylene rubber (EPR), ethylene-propylene-diene rubber (EPDM), butyl rubber, polyisoprene, polybutadiene, and styrene-butadiene rubber (SBR) having a Mooney viscosity less than 200, preferably less than 50, most preferably less than 20, per ASTM D-1646 test method. The preferred rubbers for the present invention are those that have either completely or mostly saturated hydrocarbon chain such as EPR, EPDM and butyl, all of which are commercially available under the trade name designation Vistalon™ from ExxonMobil Chemical Company, Houston, Tex.

The tackifying resins or tackifiers which are used in the hot melt adhesives of the present invention are those which extend adhesive properties and improve specific adhesion. As used herein, the term "tackifying resin" include:

(a) aliphatic and cycloaliphatic petroleum hydrocarbon resins having Ring and Ball softening points of from 10° C. to 160° C., as determined by ASTM method E28-58T, the latter resins resulting from the polymerization of monomers consisting primarily of aliphatic and/or cycloaliphatic olefins and diolefins; also included are the hydrogenated aliphatic and cycloaliphatic petroleum hydrocarbon resins; examples of such commercially available resins based on a C5 olefin fraction of this type are piccotac 95 tackifying resin sold by Hercules Corp. and Escoreze 1310LC sold by ExxonMobil Chemical Company;

(b) Aromatic petroleum hydrocarbon resins and the hydrogenated derivatives thereof;

(c) Aliphatic/aromatic petroleum derived hydrocarbon resins and the hydrogenated derivatives thereof;

(d) Aromatic modified cycloaliphatic resins and the hydrogenated derivatives thereof;

(e) Polyterpene resins having a softening point of from about 10° C. to about 140° C., the latter polyterpene resins generally resulting from the polymerization of terpene hydrocarbons, such as the mono-terpene known as pinene, in the presence of Friedel-Crafts catalysts at moderately low temperatures; also included are the hydrogenated polyterpene resins;

(f) Copolymers and terpolymers of natural terpenes, e.g. styrene/terpene, α-methyl styrene/terpene and vinyl toluene/terpene;

(g) natural and modified rosin such as, for example, gun rosin, wood rosin, tall-oil rosin, distilled rosin, hydrogenated rosin, dimerized rosin and polymerized rosin;

(h) glycerol and pentaerythritol esters of natural and modified rosin, such as, for example, the glycerol ester of pale wood rosin, the glycerol ester of hydrogenated rosin, the glycerol ester of polymerized rosin, the pentaerythritol ester of pale wood rosin, the pentaerythritol ester of hydrogenated rosin, the pentaerythritol ester of tall-oil rosin, and the phenolic modified pentaerythritol ester of rosin;

(i) phenolic-modified terpene resins such as, for example, the resin product resulting from the condensation in an acidic medium of a terpene and a phenol;

Mixtures of two or more of the above described tackifying resins may be required for some formulations. Although a range of 5% to 65% by weight tackifying resin may be used, the preferred amount is from about 30% to about 50% by weight. Tackifying resins which are useful for the present invention can perhaps include polar tackifying resins, however, the choice of available polar tackifying resins is limited in view of the fact that many of the polar resins appear only partially compatible with SPP and APAO polymers.

As noted above, tackifying resins which are useful within the scope of the present invention comprise about 5% to 65% by weight. Preferably, the tackifying resins can be selected from any of the nonpolar types, which are commercially available. Preferred resins are aliphatic petroleum hydrocarbon resins examples of which are based on C5 olefins such as Hercotac 1148 available from Hercules Corp. Most preferred are nonpolar products which are hydrogenated di-cyclopenta-diene (DCPD) based or aromatically modified derivatives thereof with softening points above 70° C. Examples of such resins are Escoreze 5400 and Escoreze 5600 sold by ExxonMobil Chemical company.

A plasticizer can be present in the composition of the present invention in amounts of 0% to about 10% by weight, preferably from about 0% to about 5%, in order to provide desired viscosity control and to impart flexibility. A suitable plasticizer may be selected from the group which includes the usual plasticizing oils, such as mineral oil, but also olefin oligomers and low molecular weight polymers, as well as vegetable and animal oils and derivatives of such oils. The petroleum derived oils which may be employed are relatively high boiling materials containing only a minor proportion aromatic hydrocarbons. In this regard, the aromatic hydrocarbons should preferably be less than 30% and more particularly less than 15% of the oil, as measured by the fraction of aromatic carbon atoms. More preferably, the oil may be essentially non-aromatic. The oligomers may be polypropylenes, polybutenes, hydrogenated polyisoprenes, hydrogenated polybutadiens, or the like having average molecular weight between about 350 and about 10,000. Suitable vegetable and animal oils include glycerol esters of the usual fatty acids and polymerization products thereof. Other useful plasticizers can be found in the families of conventional dibenzoate, phosphate, phthalate esters, as well as esters of mono- or polyglycols. Examples of such plasticizers includes, but are not limited to dipropylene glycol dibenzoate, pentaerythritol tetrabenzoate, 2-ethylhexyl diphenyl phosphate, polyethylene glycol 400-di-2-ethylhexoate; butyl benzyl phthalate, dibutyl phthalate and dioctylphthalate. The plasticizers that finds usefulness in the present invention can be any number of different plasticizers but the inventors have discovered that the mineral oil and liquid polybutenes having average molecular weight less than 5,000 are particularly advantageous. As will be appreciated, plasticizers have typically been used to lower the viscosity of the overall adhesive composition without substantially decreasing the adhesive strength and/or the service temperature of the adhesive as well as to extend the open time and to improve flexibility of the adhesive.

Waxes can be used to reduce the melt viscosity of the hot melt adhesive composition. Although amounts varying from about 0% to 50% by weight may be used in the composition of the present invention, the preferred amounts are between 0% to 25% by weight. These waxes can also effect the set-up time and the softening point of the adhesive. Among the useful waxes are:

1. low molecular weight, that is, number average molecular weight (Mn) equal to 500-6000, polyethylene having a hardness value, as determined by ASTM method D-1321, of from about 0.1 to 120, having an ASTM softening point of from about 65° C. to 140° C.;
2. petroleum waxes such as paraffin wax having a melting point of from about 50° C. to 80° C. and microcrystalline wax having a melting point of from about 55° C. to 100° C., the latter melting points being determined by ASTM method D127-60;
3. synthetic waxes made by polymerizing carbon monoxide and hydrogen such as Fischer-Tropsch wax; and
4. polyolefin waxes. As used herein, the term "polyolefin wax" refers to those polymeric or long-chain entities comprised of olefinic monomer units. This type of materials is commercially available from Eastman Chemical Co. under the trade name designation "Epolene". The materials which are preferred for use in the composition of the present invention have a Ring and Ball softening point of from about 100° C. to 170° C. As should be understand, each of these wax diluents is solid the room temperature.

Other substances which include hydrogenated animal, fish and vegetable fats and oils such as hydrogenated tallow, lard, soya oil, cottonseed oil, castor oil, menhadin oil, cod liver oil, and the like, and which are solid at the room temperature by virtue of their being hydrogenated, have also been found to be useful with respect to functioning as a wax diluent equivalent. These hydrogenated materials are often referred to in the adhesive industry as "animal or vegetable waxes".

The present invention may include a stabilizer in an amount of from about 0% to about 3% by weight. Preferably from about 0.1% to 1% of a stabilizer is incorporated into the composition. The stabilizers which are useful in the hot melt adhesive compositions of the present invention are incorporated to help protect the polymers noted above, and thereby the total adhesive system, from the effects of thermal and oxidative degradation which normally occurs during the manufacture and application of the adhesive as well as in the ordinary exposure of the final product to the ambient environment. Among the applicable stabilizers are high molecular weight hindered phenols and multifunction phenols, such as sulfur and phosphorous-containing phenols. Hindered phenols are well known to those skilled in the art and may be characterized as phenolic compounds that also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus providing the phenolic compound with its stabilizing properties. Representative hindered phenols include:

1,3,5-trimethyl-2,4,6-tris(3-5-di-tert-butyl-4-hydroxybenzyl) benzene;

pentaerythirtol tetrakis-3(3,5-di-tert-butyl-4-hydroxyphenyl) propionate;

n-octadecyl-3(3,5-di-tert-butyl-4-hydroxyphenyl) propionate;

4,4'-methylenebis(4-methyl-6-tert butylphenol);

2,6-di-tert-butylphenol;

6-(4-hydroxyphenoxy)-2,4-bis(n-octylthio)-1,3,5-triazine;

2,3,6-tris(4-hydroxy-3,5-di-tert-butyl-phenoxy)-1,3,5-triazine;

di-n-octadecyl-3,5-di-tert-butyl-4-hydroxybenzylphosphonate;

2-(n-octylthio)ethyl-3,5-di-tert-butyl-4-hydroxybenzoate; and sorbitol hexa-3(3,5-di-tert-butyl-4-hydroxy-phenyl) propionate.

Especially preferred as a stabilizer is pentaerythritol tetrakis-3(3,5-di-tert-butyl-4-hydroxyphenol) propionate.

The performance of these stabilizers may be further enhanced by utilizing, in conjunction therewith; (1) synergists such as, for example, thiodipropionate esters and phosphites; and (2) chelating agents and metal deactivators as, for example, ethylenediamenetetraacitic acid, slats thereof, and disalicylalpropylenediimine.

It should be understood that other optional additives may be incorporated into the adhesive composition of the present invention in order to modify particular physical properties. These may include, for example, such materials as inert colorants e.g. titanium dioxide, fillers, fluorescent agents, surfactants, other types of polymers, etc. Typical fillers include talc, calcium carbonate, clay silica, mica, wollastonite, feldspar, aluminum silicate, alumina, hydrated alumina, glass microspheres, ceramic microspheres, thermoplastic microspheres, baryte and wood flour. Surfactants are particularly important in hygienic disposable nonwoven because they can dramatically reduce the surface tension, for example, of the adhesive applied to diaper core, thereby permitting quicker transport and subsequent absorption of urine by the core.

The hot melt adhesive composition of the present invention may be formulated by using any of the mixing techniques known in the art. A representative example of the prior art mixing procedure involves placing all the components, except the polymers, in a jacketed mixing kettle equipped with a rotor, and thereafter raising the temperature of the mixture to a range from 300° F. to 400° F. to melt the contents. It should be understood that the precise temperature to be used in this step would depend on the melting points of the particular ingredients. The polymers are subsequently introduced to the kettle under agitation and the mixing is allowed to continue until a consistent and uniform mixture is formed. The content of the kettle is protected with inert gas such as carbon dioxide or nitrogen during the entire mixing process.

Figure 4:
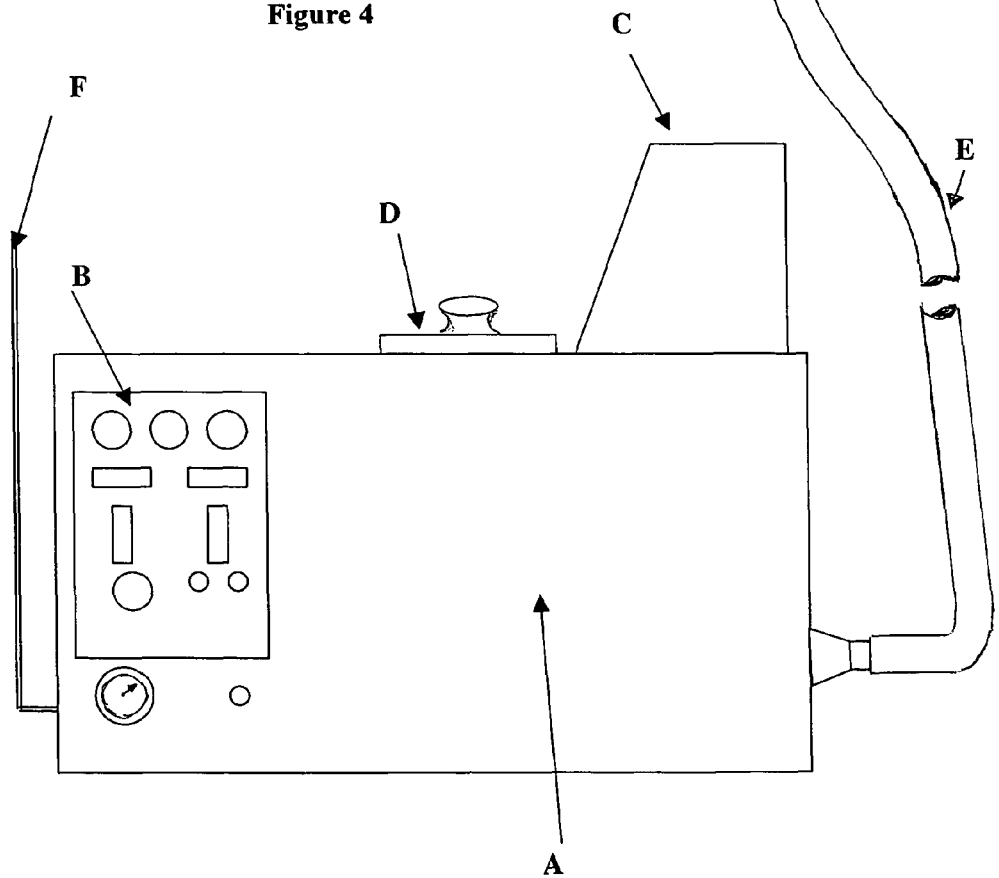
FIG. 4 is an enlarged plan view illustrating the face of a spiral spray nozzle used with the coating device of FIG. 1.

FIG. 1 is a schematic illustration of a commercial manual coating device that consists of an integrated melter A and a handgun G connected by a hot melt hose E. The integrated melter A has a motor-pump assembly C, a control panel B that controls and regulates the temperature and coating weight, a melting tank D and a compressed gas inlet F. The handgun G is fitted with a spiral spray nozzle H, the details of which is shown in the enlarged drawing of FIG. 4. As illustrated in FIG. 4, nozzle H is of conventional design and includes a head I having a plurality of circumferentially arranged and spaced orifices J for emitting compressed air and a center nozzle tip K through which the adhesive is applied by an operator.

Figure 2:
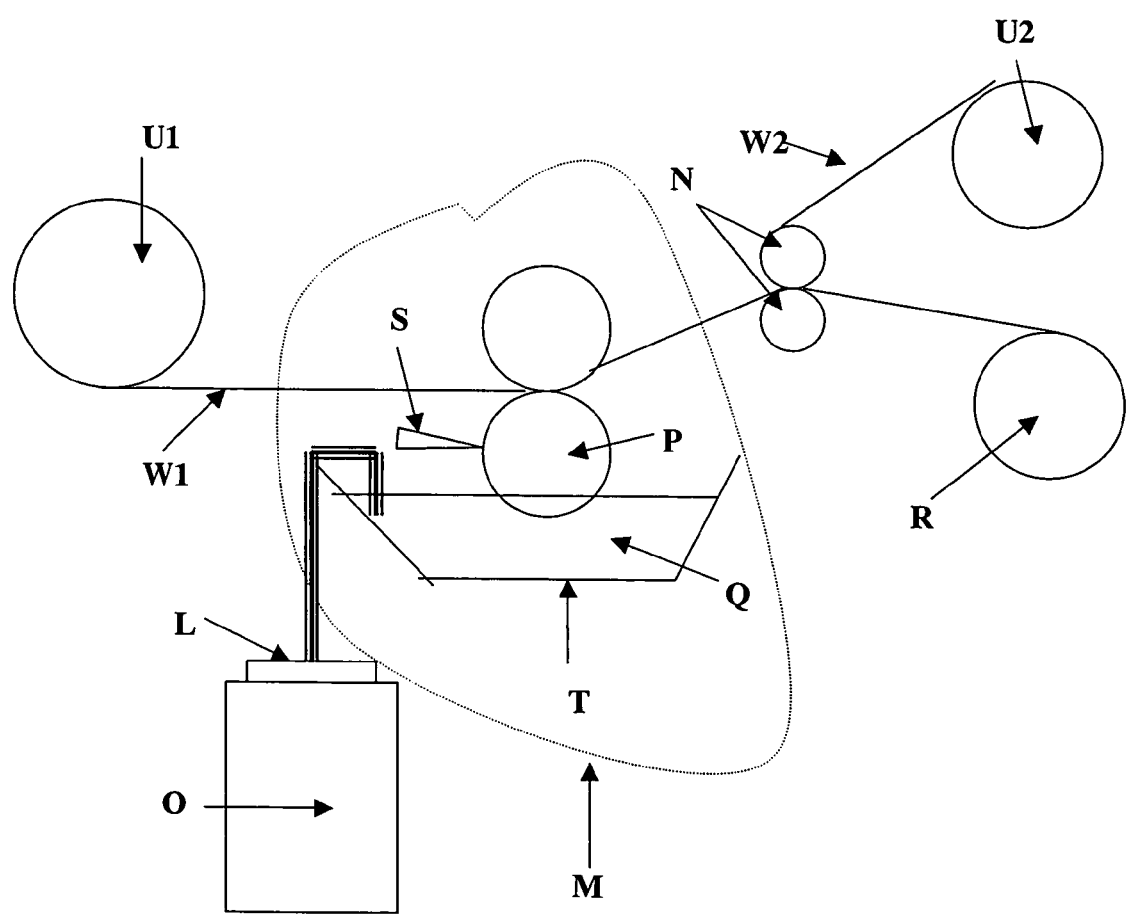
FIG. 2 is a schematic illustration of a coating device that is used in the continuous coating of webs.

FIG. 2 is a schematic illustration of a coating system that is used in the continuous coating of webs. It consists of a knife-over-roll coater represented by the components enclosed in the dotted curve M, a hot melt unloader L, a hot melt drum O and auxiliary web handling rollers U1, U2, N and R where U1 and U2 are unwind rolls for webs W1 and W2, respectively, N is a pair of nip rolls and R is a rewind roll. Hot melt adhesive Q in drum O is pumped by unloader L into the trough T. The adhesive Q is then metered and coated on web W1 by using pick-up roll P and knife S of the knife-over-roll coater. The coated web W1 is then bonded or laminated to web W2 at nip rolls N and the laminated webs are wound up at rewind roll R.

Figure 3:
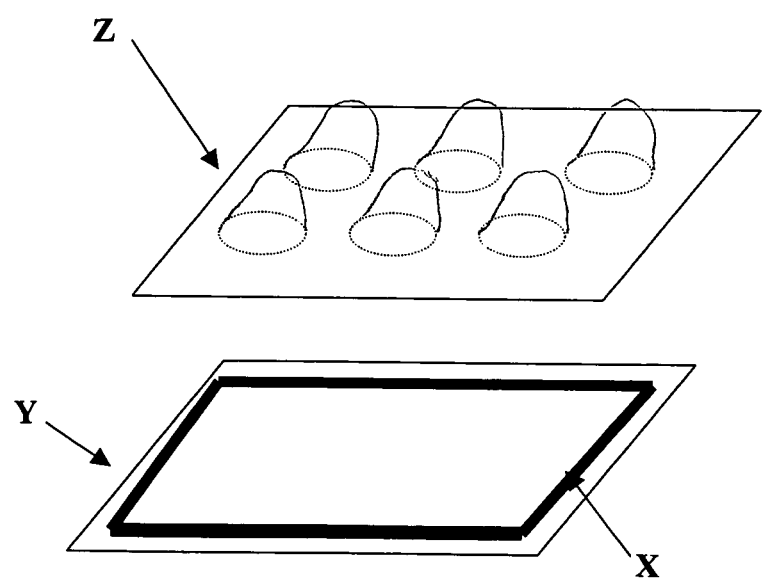
FIG. 3 is a schematic illustration of an auto headliner assembly.

FIG. 3 is a schematic illustration of an auto headliner board Y coated with hot melt adhesive bead X. An auto safety plastic sheet Z shown above board Y can be brought in line with and pressed against bead X to make a bonded assembly that is typical of auto headliner production.

The present invention thus also relates to apparatus for coating the hot melt composition by a hot melt coating or applying device that consist primarily of at least two of following components:
1. A melting container such as Nordsonm™ Hot melt melter;
2. A hot melt conveying and/or metering unit such a gear pump or roller;
3. A reservoir to hold the molten hot melt for access by the metering unit;
4. At least one connector that is capable to conduct molten material from one unit to another, such as a temperature controlled hose;
5. At least one coating head such as continuous or intermittent slot, combed slot, wheel, roll and bead coating, continuous or intermittent spiral spray, melt blown, control-coat, omega coating, summit coating and the like;
6. An optional regulator for intermittent application;
7. Temperature controller(s); the said controller(s) may resides with each other unit(s) or separately on a control panel;
8. A speed controller to control the rate of adhesive flow of the metering unit.

The control components, such as temperature controllers and speed controller, may reside within the component they control or may reside separately on a centralized control panel. There are essentially numerous machine configurations possible and the actual configuration varies according to the operation needs and conditions. The device may serve as a stand-alone coating unit or may form a part of more complicated coating machine such as a web lamination line. Examples of such coating devices are shown schematically in FIGS. 1 and 2. The components of the devices are commercially available and can be purchased from a number of sources such as Nordson Corporation, Atlanta, Ga., or ITW Corporation, Boston, Mass. Alternatively, the integrated, user ready type of coating devices such as shown in FIGS. 1 and/or 2, can also be supplied by the same source.

The present invention also relates to a process of coating or applying the adhesive composition by means of using the hot melt coating device herein disclosed above, which includes the following steps:
1. Melt the adhesive by means of a suitable melting container such as a Nordsonm™ Hot melt melter or the like at a temperature of about 250° F. to about 450° C., preferably of about 300° F. to about 400° F. and most preferably of about 350° F. to about 400° F.;
2. Apply or coat the hot melt composition to a first substrate;
3. Bond the said first substrate to a second substrate by bringing the said substrates into contact with each other under compression or pressure;
4. Transport the bonded part or web to subsequent processing steps in the production cycle.

In a preferred embodiment, the hot melt adhesive of the present invention is sprayed onto a substrate using spiral spray, which is a preferred technique to produce a filamentary spiral pattern for industrial assembly. In one example, the hot melt coater consists of a melting tank having an integrated gear pump and temperature control, as shown in FIG. 1, and a hand held spray gun equipped with a disc like coating die that has a nozzle tip in the center. The tank and the spray gun are connected through a heated hose. The tip is surrounded with a series of inclined orifices for hot air jets to pass through. The hot melt adhesive is pumped out of the nozzle in the form of a fine filament. The filament is then rotated by high-velocity hot air jets coming out of the orifices, thereby producing a helical pattern from a single strand of adhesive. The diameter of the filament is preferably controlled with 0.1 mm to 2 mm range, and more preferably within 0.2 mm to 1.0 mm range and most preferably within 0.3 mm to 0.8 mm range. In another preferred embodiment, the adhesive of the present invention is applied by using bead coating technique. This method is particularly popular in appliance and automotive OEM industries. In one example, adhesive bead is applied to a substrate through a manual glue gun. The bead diameter is preferably controlled within 0.5 mm to 10 mm range, preferably with 0.5 mm to 5 mm rang and most preferably with 1 mm to 5 mm range.

Each of the coating or applying techniques herein described above can be operated manually, semi-automatically and fully automatically through the use of industrial robots. In each case, the open time of the adhesive must be well tailored to suit the conditions of a particular mode of adhesive bonding operation. The open time of a hot melt is the time interval from the completion of adhesive coating to loss of tack, i.e., the loss of adhesive's ability to make a bond with the second substrate. Manual assembly usually requires longer open time, normally above 3 minutes, to accommodate slower and varied speed of human response. In contrast, semi-automatic and fully automatic assembly usually require shorter open time, normally less than 3 minutes, to meet the fast assembly speed. It shall be understood, however, that there is considerable overlap in open time requirements between manual and automatic adhesive bonding operation in OEM manufacturing. The hot melt adhesive composition of the present invention advantageously provides very broad range of open time from 10 seconds to 30 minutes. One can adjust the ratios of adhesive component to achieve a specified open time with little or no sacrifice of other performance properties.

In today's durable goods OEM manufacturing environment, one often encounters various and complicated adhesive bonding applications where a number of different components or parts are involved. These components or parts are usually made of different materials, and therefore, poses stringent requirements for adhesives to provide good adhesion to a broad spectrum of substrates and to have the durability and heat resistance for the integrity and harsh application environment. Prior art hot melts based on EVA, SBC block copolymer, APAO, polyester and polyamide either lack adhesion, or heat resistance or both and therefore, cannot meet all the requirements. The present invention is well suited to meet the needs that prior art hot melt failed to provide and offers excellent adhesion, bond durability and heat resistance for bonding metal, treated and untreated plastic, wood, woven and nonwoven fabrics, coated and noncoated paper boards, rubber hoses, vulcanized rubber profiles, polyolefin and polyurethane foams, electrical cables, wire harnesses, and glass to each other and to itself. The end products of the bonding process include, but are not limited to, finished goods, components or parts that are used subsequently to make finished goods, and intermediates that will be further processed or incorporated into or combined with other materials to produce parts or finished goods.

Tests and Materials

Brookfield viscosity was tested according to ASTM D-3236 Method at 350° F.

Ring & Ball softening point was determined with an automated Herzog unit according to ASTM E-28 method.

Shear Adhesion Failure Temperature (SAFT) was measured with a BlueM™ programmable oven equipped with a Minitren™ 205 automatic shear station by using a kraft to kraft laminated specimen. To prepare the test specimen, the hot melt adhesive was melted at 350° F. and kept on a hot plate to keep warm. The adhesive was then applied to a piece of 1" wide virgin kraft linerboard of over 100 lbs/ream basis weight with a 1-mil. draw-down bar. A second piece of the same sheet was immediately bonded to the first to create 1"×1" bonded area. After at least 12 hours conditioning at ambient temperature, the specimen was placed in the shear station and a dead weight of 1 kg was hung to the end of each specimen. The oven was then heated at 3° F./min heating rate. The bonding failure temperature in ° F. was recorded as SAFT.

Open time was measured with an approximately 2 mm diameter adhesive bead coated on 100 lbs/ream virgin Kraft linerboard. Immediately after applied from a hand glue gun, Kraft strips of about 0.25" wide were placed on the bead with finger pressure at fixed time interval. The time interval varied according to expected open time of each adhesive. The onset at which the adhesive failed to produce fiber tear bond is defined as open time, given either in seconds or in minutes.

Adhesion was measured according to the following procedure. The adhesive to be tested was first melted at 350° F. and then applied to a untreated plastic test plaque (4"×1"×⅛" dimension) by using a spatula to cover about 1 square inch area. After conditioning at room temperature for 24 hours, attempt was made to remove the adhesive from the plaque by using a Hyde™ putty knife. If the adhesive was easily and adhesively removed, it was rated 1. If it was not removable, it was rated 4. Intermediate ratings of 2 and 3 were assigned according to the degree of difficulty in removing the adhesive, with the higher number meaning stronger bond. The plastic plaques used for the test included polyethylene, polypropylene, ABS resin, polycarbonate and polymethyl methacrylate. All these plastic materials were obtained from commercial sources and will be further described subsequently.

Bond environmental durability test were conducted with the following procedure. To prepare the test specimen, polyethylene auto headliner safety plastic was bonded to polyester nonwoven outlayer of a composite auto headliner board by using 3 mm bead applied through a hand glue gun in the manner schematically illustrated in FIG. 3. After conditioning at the room temperature for 24 hours, the bonded specimen was then subjected three cold-hot cycles of −20° F., 24 hours, and then 180° F., 24 hours. At the end of each cycle, the specimen was observed for debonding. The specimen that showed no debonding was deemed to pass, otherwise, to fail. The safety plastic was then hand peeled from the board. The mode of failure was noted.

Polyethylene plastic test plaque was fabricated from Union Carbide DEFD1331 NAT grade high density polyethylene resin. It was obtained from Union Carbide Corporation, Houston, Tex., now part of Dow Chemical of Midland, Mich.

Polypropylene plastic test plaque was fabricated from Tenite V525 grade polypropylene resin obtained from Eastman Chemical Company, Kingsport, Tenn.

ABS plastic test plaque was fabricated from Cycolvac AR 3501 grade ABS resin obtained from GE Plastics, Pitfield, Mass.

Polycarbonate plastic test plaque was fabricated from Lexan L52-4158 grade polycarbonate resin, also supplied by GE Plastics.

Polymethyl methacrylate test plaque was fabricated from Plexiglas V825 grade resin supplied by Ato Haas, Philadelphia, Pa.

Polyethylene auto headliner safety plastic and composite auto headliner board was obtained from Oakwood Group, Inc. Dearborn, Mich.

Finaplast 1751 is an propylene-ethylene copolymer type of SPPs prepared by using single-site metallocene catalyst system as that disclosed in U.S. Pat. No. 5,476,914. The polymers contain about 10% by weight of ethylene and are commercially available from Total Petrochemicals Inc, Houston, Tex. It has a r value of about 95%, a density of 0.87 g/cc and a DSC melting point of 130° C. It has a melt flow rate of about 25 g/10 min as determined by using ASTM Method D-1238.

Finacene EOD 02-15, obtained from Total Petrochemicals, is a propylene-ethylene copolymer type of mRCP having a density of 0.89 g/cc and a MFR of about 12.

N01096-02, obtained from Total Petrochemicals, is a developmental propylene-ethylene copolymer SPP having about 10% by weight ethylene. It has a r value of about 95%, a density of 0.87 g/cc and a melt flow rate of 75 g/10 min.

N01163-B, obtained from Total Petrochemicals, is a developmental propylene-ethylene copolymer of mRCP type having a density of 0.89 g/cc and a melt flow rate of 100 g/10 min.

Eastoflex P1010, obtained from Eastman Chemical Company, Kingsport, Tenn., is an atactic homopolypropylene type of APAO having a Brookfield viscosity of about 1,000 cP at 190° C., a Tg of about −10° C. and a softening point of about 150° C.

Eastoflex P1023, obtained from Eastman Chemical Company, Kingsport, Tenn., is an atactic homopolypropylene type of APAO having a Brookfield viscosity of about 2,300 cP at 190° C., a Tg of about −10° C. and a softening point of about 155° C.

Eastoflex E1060, also obtained from Eastman Chemical Company, is an atactic propylene-ethylene copolymer type of APAO having a Brookfield viscosity of about 6000 cP at 190° C., a Tg of about −23° C. and a softening point of about 135° C.

Eastoflex E-1200, also obtained from Eastman Chemical Company, is an atactic propylene-ethylene copolymer type of APAO having a Brookfield viscosity of about 12,000 cP at 190° C., a Tg of about −28° C. and a softening point of about 135° C.

Vestoplast 703 is a propylene rich APAO having a Brookfield viscosity of about 2700 cP at 190° C., a Tg of about −28° C. and a softening point of about 124° C. It is commercially available from Degussa Corporation, Parsippany, N.J.

Adflex X100F is a blend of EPR and semicrystalline polyolefin obtained from Basell Polyolefins in Willmington, Del. It has a density of 0.90 g/cc and a MFR of about 8 g/10 min.

Piccotac 9095 is an aromatically modified C5 aliphatic hydrocarbon resin having a R&B softening point of 100° C. It is purchased from Eastman Corporation.

Epolene N-10 is a polyolefin wax having a density of 0.925 g/cc, a Brookfield viscosity of 1,500 cP at 125° C. and R&B softening point of about 111° C. It is commercially available from Eastman Chemical Company.

Epolene-N-15 is a polypropylene wax having a density of 0.902 g/cc, a Brookfield viscosity of 600 cP at 190° C. and R&B softening point of about 163° C. It is also commercially available from Eastman Chemical Company.

Nyplast 222B is a mineral oil plasticizer, obtained from Nanas USA, Inc. Houston, Tex.

Indopol 100, purchased from Chemicentral Milwaukee, New Berlin, Wis., is liquid plasticizer comprising of low molecular weigh isobutene-butene copolymer.

Irganox 1010 is a hindered phenol type antioxident. It is commercially available from Ciba Specialty Chemicals, Tarrytown, N.Y.

Sylvarez ZT 115 LT is a styrenated terpene resin having a R&B softening point of 115° C. It is purchased from Arizona Chemicals, Panama City, Fla.

Vistamaxx 2210 is obtained from ExxonMobile Chemicals, Houston, Tex., and is a propylene-ethylene copolymer prepared by using a single site catalyst. It contains about 13% by weight of ethylene unit and has a density of 0.867 g/cc and a MFR of about 24 g/10 min.

The invention is further illustrated by way of the examples that are set forth below.

EXAMPLES 1-3

Hot melt adhesive examples of 1-3 shown in Table 1 were prepared with the ingredients and mixing procedures described herein above. Sample 1 contains both SPP and mRCP, whereas Samples 2 and 3 are based on SPP alone. A total of 250 grams each were made and the mixing was carried out at 350-375° F. under carbon dioxide atmosphere in a laboratory type of mixer what consists of a propeller powered by a motor, a heating mantle, a temperature control unit and a container of about 1 pint in size. The appropriate amounts of each component, calculated according to the ratios shown in the table, except the SSC polymers, were added to the container. The temperature of the container was then raised to melt the content. After the ingredients in the container were completely melted, the motor was turned on to start agitation. Subsequently, the SSC polymer component(s) was (were) introduced. These examples are particularly formulated to have a wide range of open time achievable by the use of the composition of present invention. The adhesives of Examples 1-3 were tested according to the procedures herein described above and the results are listed in table 1.

TABLE 1

Examples 1-3

| | Percent (%) by weight | | |
|---|---|---|---|
| Ingredients | 1 | 2 | 3 |
| Piccotac 9095 | — | 36.0 | 31.0 |
| Sylvarez ZT115LT | 28.0 | — | — |
| Eastoflex P1010 | 30.0 | 22.3 | — |
| Eastoflex E1200 | — | 26.2 | — |
| Eastoflex E1060 | — | — | 55.7 |
| Eastoflex D1023 | 20.0 | — | — |
| NO-1096-2 | 11.5 | — | — |
| Finaplast 1751 | — | 15.0 | 12.8 |
| Vistamaxx 2210 | 10.0 | — | — |
| Epolene N-15 | — | — | 10.0 |
| Irganox 1010 | 0.5 | 0.5 | 0.5 |
| Room Temperature Tack | None | None | None |
| Brookfield Vis. (cP), 350° F. | 16100 | 16000 | 12550 |
| R&B Softening Point (° F.) | 298 | 300 | 260 |
| SAFT (° F.) | 220 | 228 | 190 |
| Open Time (min) | 3.0 | 3.0 | 25.0 |
| Adhesion to | | | |
| PE | 4 | 4 | 4 |

TABLE 1-continued

Examples 1-3

| | Percent (%) by weight | | |
|---|---|---|---|
| Ingredients | 1 | 2 | 3 |
| PP | 4 | 4 | 4 |
| Polycarbonate | 4 | 3 | 4 |
| Polymethyl Methacrylate | 4 | 3 | 4 |
| ABS Resin | 4 | 3 | 4 |
| Durability | Pass | Pass | Pass |

EXAMPLES 4-6

Examples of 4-6 were formulated by using mRCP polymer using the same procedures as herein described above. The ingredients are listed in Table 2. These mRCP containing formulations are well suited as general purpose products for OEM assembly application. Example 4, having an open time of 6 minutes, is particularly useful for manual handling, whereas Example 5 and 6, with an open time of 0.5 minutes, are more suited for automatic assembly operation. The adhesives of Examples of 4-6 were found to have almost no or very low room temperature tack, low melt viscosity, and good heat stability. The adhesives of Examples 4-6 were also tested according to the procedures herein described above and the results are listed in table 2.

TABLE 2

| | Percent (%) by weight | | |
|---|---|---|---|
| Ingredients | 4 | 5 | 6 |
| Indopol 100 | — | — | 10.0 |
| Piccotac 9095 | 30.0 | 30.0 | 30.0 |
| Eastoflex E1060 | 39.5 | — | — |
| Vestoplast 703 | — | 39.5 | 34.5 |
| NO-1163-B | 30.0 | 30.0 | 25.0 |
| Irganox 1010 | 0.5 | 0.5 | 0.5 |
| Room Temperature Tack | None | None | None |
| Brookfield Vis. (cP), 350° F. | 22000 | 14050 | 9600 |
| R&B Softening Point (° F.) | 264 | 256 | 256 |
| SAFT (° F.) | 211 | 236 | 205 |
| Open Time (min) | 6.0 | 0.5 | 0.5 |
| Adhesion to | | | |
| PE | 4 | 4 | 4 |
| PP | 4 | 4 | 4 |
| Polycarbonate | 4 | 4 | 3 |
| Polymethyl Methacrylate | 4 | 4 | 3 |
| ABS Resin | 2 | 3 | 4 |
| Durability | Pass | Pass | Pass |

EXAMPLES 7-10

Examples of 7-10 were formulated by using advanced bi-component thermoplastic polyolefin using the same procedures as herein described above. The ingredients are listed in Table 3. These examples all have a SAFT greater than 220° F. and excellent adhesion to various substrates. They are formulated to meet the stringent heat resistance and durability requirements of the automotive industry and are particularly useful in auto interior applications such as auto headliner, door trims, carpet bonding and the like. The adhesives of Examples 7-10 were also tested according to the procedures herein described above and the results are listed in table 3.

TABLE 3

| Ingredients | Percent (%) by weight | | | |
|---|---|---|---|---|
| | 7 | 8 | 9 | 10 |
| Nyplast 222B | 10.0 | — | — | — |
| Piccotac 9095 | 45.0 | 53.0 | 40.0 | 35.0 |
| Epolene N-10 | — | — | — | 10.0 |
| Eastoflex P1010 | — | — | 44.5 | 39.5 |
| Eastoflex P1023 | 29.5 | 31.5 | — | — |
| Adflex X100F | 15.0 | 15.0 | 15.0 | 15.0 |
| Irganox 1010 | 0.5 | 0.5 | 0.5 | 0.5 |
| Room Temperature Tack | None | None | None | None |
| Brookfield Vis. (cP), 350° F. | 10220 | 12620 | 12650 | 10650 |
| R&B Softening Point (° F.) | 298 | 295 | 305 | 298 |
| SAFT (° F.) | 228 | 220 | 240 | 242 |
| Open Time (min) | 2.5 | 3.0 | 2.0 | 1.25 |
| Adhesion to | | | | |
| PE | 4 | 4 | 4 | 4 |
| PP | 4 | 4 | 4 | 4 |
| Polycarbonate | 4 | 4 | 4 | 4 |
| Polymethyl Methacrylate | 4 | 4 | 4 | 4 |
| ABS Resin | 4 | 4 | 4 | 3 |
| Durability | Pass | Pass | Pass | Pass |

Without deviating from the spirit and scope of the present invention, many embodiments and variations can be made by using the components disclosed herein above.

EXAMPLE 11

This example demonstrates the process of applying manually the adhesives of the present invention and the production of bonded articles therewith. The adhesive of example 1 was heated in an air circulating oven at 350° F. to melt. Subsequently about 50 grams of the molten adhesive was introduced into the sample chamber of a MiniSquirt manual glue gun, the temperature of which was maintained at about 350° F. The adhesive bead of about 3 mm in diameter was then applied to the polyester nonwoven side of an auto headliner board to cover a rectangular area of about 2"×3" in size. A piece of HDPE auto headliner safety plastic about one quarter inch (¼") larger in each dimension of the rectangle was applied manually to the bead under slight finger pressure. The entire assembly was then allowed to cool to room temperature. A strong bond was formed between the auto headliner board and the safety plastic. The process was repeated for the adhesives of Examples 2-10. After conditioning at room temperature for 24 hours, the bonded specimens were subjected to the cycle bond durability test outlined herein above. At the end of the cycle, the specimens were inspected for bond integrity. There was no sign of debonding with any of the specimens tested and they all passed the bond environmental durability test.

EXAMPLE 12

This example demonstrates the process of preparing the adhesives of the present invention in a pilot hot melt kettle. A total of 100 pounds of adhesive sample was prepared by using the formula and ingredients of Example 2 in a jacketed kettle equipped with a motor and a propeller. The kettle was heated to about 350° F. by circulating oil medium through its jacket via a circulating oil heater that was connected to the jacket by a hose. Each of the following ingredients, 36 lb of Piccotac 9095, 0.5 lbs of Irganox 1010, 22.3 lbs of Eastoflex P1010 and 26.2 lbs of Eastoflex E1200 was slowly added in turn through the mouth of the kettle under stirring. The contents were then allowed to melt. After the temperature of the contents reached 350° F., 15 lbs of Finaplast 1751 polymer was added and the mouth was then closed. The mixing was continued under carbon dioxide protection until the polymer became completely dissolved. The adhesive sample was then discharged and packaged in a 5-lb capacity silicone coated paper box and stored for subsequent use.

EXAMPLE 13

By using the same procedure as outlined in Example 12, a total of 100 lbs of adhesive sample was prepared by using the formula and ingredients of Example 7. Each of the ingredients in the following amounts, 10 lbs Nyplast 222B, 45 lbs Piccotac 9095, 0.5 lbs Irganox 1010, and 29.5 lbs Eastoflex P1023 was in turn added to the kettle with stirring. The contents were then allowed to melt. After the temperature of the contents reached 350° F., 15 lbs of Adflex X100F polymer alloy was then added. The finished adhesive sample was then packaged in a 5 lb capacity silicone coated box and stored for subsequent use.

EXAMPLE 14

This example illustrates the process of applying the adhesives of the present invention by using hot melt coating equipment and the preparation of a bonded article. The adhesive samples of Examples 12 and 13 were each applied by using a Microset™ hot melt coater of the type shown in FIG. 1, purchased from Nordson Corporation. The coater was equipped with a Nordson Model AD-31 STR coating gun fitted with a spiral spray nozzle of the type herein described above. About 10 lbs of the adhesive of Example 12 was added to the melting tank of the coater and heated to about 375° F. The hose temperature was also maintained at the same temperature. The adhesive was sprayed with the aid of compressed air onto an auto headliner board of the same type as Example 11 to cover approximately a 4"×6" area. The coating was controlled at about 15-20 g/m². The coated headliner board was then brought and bonded together with an auto safety plastic of about the same size to form an article. The procedure was repeated for the adhesive of Example 13. The articles were tested after cooling to room temperature by hand and showed fiber tear bond strength.

EXAMPLE 15

This example demonstrates the process of applying the adhesives of the present invention automatically through a robotically controlled bead nozzle and the preparation of a bonded article therewith. A Nordson FoamMelt™ Model FM 151 hot melt coater was connected to the arm of an ASEA Model IRB 6 industrial robot, purchased from ABB Inc., Auburn Hill, Mich. A coating head was fitted with a bead nozzle to dispense adhesive in the form of a bead. The coating head was also equipped with an air-mixing chamber to allow dispensing of the adhesive in the form of foam, if needed. The adhesive of Example 13 was applied in solid bead to a composite auto headliner board at a length of about 6 inches. The coating temperature was set uniformly at 375° F. through the melting tank and the coating head. The robot was programmed to dispense an adhesive bead of about 5 mm in diameter. Immediately after coating, a rubber hose of about 0.25" OD was applied to the adhesive bead to produce a bonded article. One article consisting of the same auto headliner board bonded to an auto wire harness, and another consisting of the board and high density polyethylene (HDPE) brace were similarly prepared. These articles exemplify the bonded components found in auto interior trims such as a headliner.

EXAMPLE 16

The articles of Example 15 were similarly prepared by using a foamed adhesive bead with air to adhesive ratio of 1:1 in volume. To produce the foamed bead, the compressed air unit of the equipment of Example 15 was turned on to admix air and adhesive. The equipment was operated at the same conditions and the adhesive of Example 13 was again used. The ability to foam the adhesives of the present invention presents substantial monetary savings to the user of the adhesive.

I claim:

1. A hot melt adhesive composition, comprising a blend of the following ingredients:
   about 5% to 50% by weight of a glassy poly-α-olefin, said glassy poly-α-olefin having a melting point greater than 100 degrees Centigrade and selected from the group consisting of metallocene catalyzed homopolymers or copolymers of propylene with from 2% to 20% by weight of one or more other α-olefin monomer selected from the group consisting of ethylene and $C_4$ to $C_{10}$ α-olefin monomers;
   about 5% to 70% by weight of a rubbery polymer, said rubbery polymer selected from the group consisting of ethylene-propylene rubber (EPR), ethylene-propylene-diene rubber (EPDM), butyl rubber, and polyisoprene;
   about 30% to 65% by weight of a compatible tackifier;
   about 0% to 3% by weight of a stabilizer;
   about 0% to 10% by weight of a plasticizer; and
   about 0% to 50% by weight of a wax,
   the ingredients of the composition adding up to 100% by weight, and the composition having a viscosity between 2,000 and 100,000 cP at 350° F.

2. The composition of claim 1 comprising about 10% to 30% by weight of the glassy poly-α-olefin polymer.

3. The composition of claim 1 wherein the glassy poly-α-olefin polymer has a melting point greater than 120° C.

4. The composition of claim 1 wherein the glassy poly-α-olefin polymer has a melting point greater than 130° C.

5. The composition of claim 1 wherein the glassy poly-α-olefin polymer has a melt flow rate of about 0.1 g/10 min. to 2,000 g/10 min.

6. The composition of claim 1 wherein the glassy poly-α-olefin polymer has a melt flow rate of about 5 g/10 min. to 200 g/10 min.

7. The composition of claim 1 wherein the glassy poly-α-olefin polymer has a melt flow rate of from about 8 g/10 min. to 100 g/10 min.

8. The composition of claim 1 wherein the glassy poly-α-olefin polymer is a polymer comprising a polymerization product of at least one α-olefin having C2-C10 carbons.

9. The composition of claim 8 wherein the glassy poly-α-olefin polymer comprises primarily propylene (C3) monomer units.

10. The composition of claim 1 comprising about 15% to 55% by weight of the rubbery polymer.

11. The composition of claim 1 wherein the rubbery polymer has a glass transition temperature below. 20° C.

12. The composition of claim 1 wherein the rubbery polymer has a glass transition temperature below 0° C.

13. The composition of claim 1 wherein the rubbery polymer has a glass transition temperature below −10° C.

14. The composition of claim 1 wherein the rubbery polymer has a melt flow rate of about 1 g/10 min. to 5,000 g/10 min.

15. The composition of claim 1 wherein the rubbery polymer has a viscosity at 177° C. of 100 mPas to about 500,000 mPas.

16. The composition of claim 1 wherein the rubbery polymer has a Mooney number of about 5 to about 200.

17. The composition of claim 1 comprising about 30% to 50% by weight of the tackifier.

18. The composition of claim 1 wherein said tackifier is selected from the group consisting of aliphatic and cyclo-aliphatic petroleum hydrocarbon resins, hydrogenated aliphatic and cyclo-aliphatic petroleum hydrocarbon resins, aromatic petroleum hydrocarbon resins, hydrogenated aromatic petroleum hydrocarbon resins, aliphatic/aromatic petroleum derived hydrocarbon resins, hydrogenated aliphatic/aromatic derived hydrocarbon resins, aromatic modified cyclo-aliphatic resins, hydrogenated aromatic modified cyclo-aliphatic resins, polyterpene resins, copolymers and terpolymers of natural terpenes, natural and modified rosin, glycerol and pentaerythritol esters of natural and modified rosin, and phenolic modified terpene resins.

19. The composition of claim 1 wherein the plasticizer is selected from the group consisting of mineral oil, olefin oligomers, and liquid polybutenes.

20. The composition of claim 1 wherein said wax is selected from the group consisting of polyethylene, petroleum waxes, synthetic waxes and polyolefin waxes.

* * * * *